Oct. 1, 1929.    T. FARMER, JR    1,729,660
FILM VIEWER
Filed Oct. 29, 1927

THOMAS FARMER, JR.
INVENTOR

BY O. V. Thiele

ATTORNEY

Patented Oct. 1, 1929

1,729,660

UNITED STATES PATENT OFFICE

THOMAS FARMER, JR., OF NEW YORK, N. Y.

FILM VIEWER

Application filed October 29, 1927. Serial No. 229,666.

This invention relates to a film-viewing device and has for its object the provision of a relatively inexpensive and at the same time convenient apparatus of this type. Particular advantages of my invention will appear more fully as the description proceeds.

Figure 2:
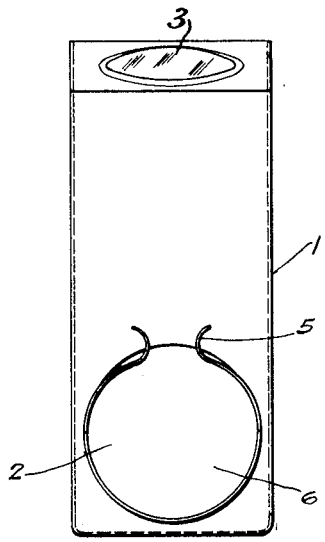
Figure 1:
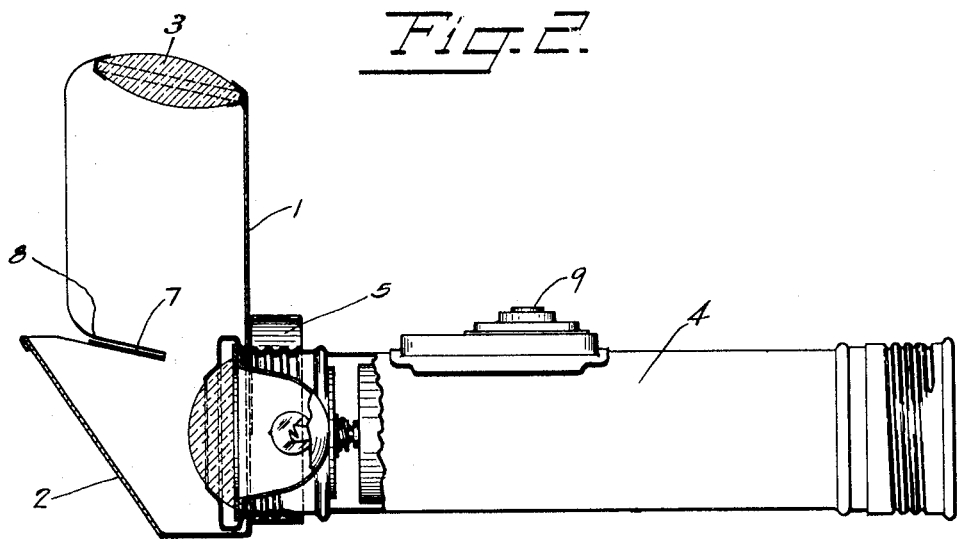

The invention is illustrated on the accompanying single sheet of drawings in which Fig. 1 shows a vertical central section of my apparatus in conjunction with a flashlight with which it is adapted to be used, and Fig. 2 shows an end elevation of my apparatus.

In the preparation of films for moving picture projecting machines of small size used extensively by amateurs, there is required a considerable amount of clipping and joining of film sections to each other. This involves a close examination of the individual film pictures. The size of these pictures is quite small and a magnifying device of some sort is a practical necessity. In arrangements usually used for this purpose, the film under examination extends from one reel to a second reel, the portion of the film under examination being the part extending between the two reels. My invention is adapted for use in viewing any individual pictures on this portion extending from one reel to the other.

The device includes a housing 1 of any convenient or desired shape which has a reflecting surface 2, a lens 3 and an opening to admit light. The source of light in the form illustrated is a pocket flashlight 4, and it is one of the features of my invention that it is readily attached to a flashlight obtainable on the market although some other readily handled source of light may be utilized if desired. The apparatus is held to the flashlight in the form illustrated by means of a spring clip 5 extending around the opening 6. Any other convenient means of holding the apparatus to the flashlight will answer. The relative disposition of the opening 6, the flashlight 4, the reflecting surface 2 and the lens 3 is such that the rays of light from the flashlight impinge upon the reflecting surface 2 and are reflected from it in a direction toward the magnifying lens 3. The film 7 is interposed between the reflecting surface 2 and the lens 3, the apparatus being provided for this purpose with a slot 8 extending from side to side through the apparatus. In using the apparatus after it has been clipped on the search-light or other source of light, it is held in one hand, the switch-button 9 being manipulated by the same hand and the apparatus being held in the position that film 7 occupies the position through the slot 8 indicated in Fig. 1. This is a convenient matter, as the film is normally in a horizontal position. The film can be slid along through the apparatus and stopped as desired to view the individual pictures.

It will be quite obvious that variations may be made in this apparatus without departing from the inventive idea as defined in the claim.

I claim:

In apparatus of the class described, the combination of a casing having two openings at substantially right angles to each other and a reflecting surface so placed relatively to the two openings that light entering one of them axially is reflected by that surface axially through the other, a magnifying lens in one of the openings and a clip at the other opening to hold the casing to a portable source of light, the casing having a slot between the lens and the reflecting surface so that the casing can readily be slipped over a stretched film of the type described whereby successive individual pictures on the film can be viewed at will and for the purpose specified.

THOMAS FARMER, Jr.